(12) United States Patent
Chakraborty et al.

(10) Patent No.: US 7,703,105 B1
(45) Date of Patent: Apr. 20, 2010

(54) METHOD FOR TRAPPING HTTP LOGOUT EVENTS AND FOR CALLING AN APPLICATION SPECIFIC LOGOUT HANDLER

(75) Inventors: Krishnendu Chakraborty, San Mateo, CA (US); Arvind Prabhakar, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1307 days.

(21) Appl. No.: 11/186,214

(22) Filed: Jul. 21, 2005

(51) Int. Cl.
*G06F 9/46* (2006.01)
*G06F 15/16* (2006.01)
(52) U.S. Cl. .................... 719/312; 709/226
(58) Field of Classification Search .............. 719/312
See application file for complete search history.

(56) References Cited

U.S. PATENT DOCUMENTS

| | | | | |
|---|---|---|---|---|
| 5,774,551 A * | 6/1998 | Wu et al. | ...................... | 713/155 |
| 7,024,451 B2 * | 4/2006 | Jorgenson | ................... | 709/203 |
| 2003/0118353 A1 * | 6/2003 | Baller et al. | ................... | 399/8 |
| 2003/0149781 A1 * | 8/2003 | Yared et al. | ................. | 709/229 |
| 2004/0128393 A1 * | 7/2004 | Blakley et al. | .............. | 709/229 |
| 2005/0198099 A1 * | 9/2005 | Motsinger et al. | ........... | 709/200 |
| 2006/0047755 A1 * | 3/2006 | Jurova | ........................ | 709/206 |

OTHER PUBLICATIONS

J2EE Policy Agents Guide, SunONE,, chapter 1, docs.sun.com/source/816-6884-10/chapter1.html, Sun Microsystems, Inc., 2004, pp. 1-14.

* cited by examiner

*Primary Examiner*—Hyung S Sough
*Assistant Examiner*—Abdou K Seye
(74) *Attorney, Agent, or Firm*—Marsh Fischmann & Breyfogle LLP; Kent A. Lembke; Jonathon A. Szumny

(57) ABSTRACT

A method of trapping a logout event includes receiving an HTTP request, checking if a URI of the HTTP request matches an entry in a first map, looking for an entry in a second map, checking for a logout parameter in a list of request query parameters, checking for a logout parameter in a header of the HTTP request, checking for a logout parameter in a body of the HTTP request, and triggering a logout event when the first of the entries or parameters if found. The method can be extended to call a logout handler and can be used in a wide range of web-based computing environments and in particular with policy/web/j2ee agents.

15 Claims, 3 Drawing Sheets

METHOD FOR TRAPPING HTTP LOGOUT EVENTS AND FOR CALLING AN APPLICATION SPECIFIC LOGOUT HANDLER

BACKGROUND OF THE INVENTION

The present invention relates to a method for trapping HTTP logout events and for calling an application specific logout handle.

The identity market is growing rapidly as more and more users are falling victims to identity theft. Though there are many different identity products in the market, most of them are designed to protect applications and resources running on application servers or web servers. This is because most of the web sites visited either run on a web server or an application server. The existing products achieve the same end goals. They authenticate and authorize users to access various web-based resources. Once the user has been authenticated in web-based applications, there is a generic need to logout the user at some point of time (once the user is done with the application). Once the user triggers a logout event on a web application, it is required by identity products to trap such events and perform the necessary steps to trap logout events and perform certain housekeeping tasks (like destroying user sessions) specific to the application.

The following problems may be faced by a user may while trying to trap such a broad range of logout events.

There is no single standard for performing HTTP logouts on any application, whether it is a web application or any other HTTP browser-based application. Hence users are free to choose any mechanism through which they may prefer to logout. This makes the problem difficult for any vendor to come up with a generic solution that works for most cases.

Once the user triggers a logout by clicking a button or a URL ("Uniform Resource Locator"), the user may or may not be directed to a unique URI (Uniform Resource Identifier") that can help the trapping mechanism to detect the logout event.

Some applications redirect the user to a specific URI, others (like portal applications) pass extra parameters in the query string to denote a logout event. Some applications embed specific information in the HTTP request such as headers or HTTP request parameters. Since the list of such mechanisms are endless due to the flexibility of the HTTP protocol, application developers are free to use any of the above-mentioned events to notify a logout. However, the innumerable ways through which the application can logout results in a non-trivial problem for any framework or vendor to trap such a huge range of logout events.

It is believed that none of the present vendors in the market has the ability to trap logout events based on a set of configurable criterions. Most of them use one or more of the above-mentioned techniques to trap a logout event.

Hence a single solution used by one vendor will not suffice for any generic J2EE web-based application.

What is needed, therefore, is a mechanism to trap logout events that is generic and extensible so that it can be configured depending upon the functionality of the end application.

Finally, even if some of the vendors have products that can trap a logout event and invalidate an HTTP session, it is believed that they do not have a mechanism to synchronize the HTTP session of the application as well as the HTTP session of an application/web/portal server. In other words, it is believed that the existing vendors do not have a mechanism to plug in a generic extensible logout handler that can be configured to perform the necessary steps for logout.

Even if a specific vendor provides such a solution for a specific logout event associated with a particular application running on a specific container, the chances that the same mechanism will work in a different environment or J2EE/web container is remote.

In sum, it is believed that no existing vendor has so far been able to provide a robust an extensible mechanism to trap logout events. Most of the existing solutions are too specific to the application server/web server used, or are application specific. Hence a particular existing solution in the market to trap a HTTP logout will not work in a different scenario.

What is desired, therefore, is a generic yet very flexible mechanism that can be used by a wide set of products, including identity products, to trap HTTP logout events and allow the user to perform any number of steps afterwards through a configurable logout handler.

SUMMARY OF THE INVENTION

According to an embodiment of the present invention, all of the criteria through which a framework can detect an HTTP logout event are consolidated and the necessary actions are subsequently taken through a pluggable logout handler. The algorithm of the present invention covers most of the edge cases and provides flexibility to the end user to make it extensible so that more criteria can be encapsulated to trap future HTTP logout events.

The method of the present invention can be used in J2EE agents, but is not limited to this application. J2EE agents are described in detail in the following publication, which is hereby incorporated by reference:

J2EE agents provide identity management to application and portal servers. Presently, the assignee of the present invention supports at least fifteen different application servers and portal servers. Through the method of the present invention, there exists a generic and yet extensible method through which any agent can logout the user, independent of the application server or portal server.

The method of the present invention can be completely decoupled and can be used by any other HTTP-based framework to trap a logout event and take the necessary steps as described above. The method of the present invention can be used to support many application servers and portal servers, and can be extended to any number of applications that run on most web servers existing in the market.

The method of the present invention is not tied to any application server or web server vendor. In fact, the whole trapping mechanism of the present invention is HTTP based and therefore any HTTP application can use this mechanism to achieve the same end goal.

The method of the present invention is application independent. For many applications there is a unique URI where the request is redirected. For others, the logout event is passed through a request parameter in a query string, HTTP header or in the HTTP body.

In the course of time, if the framework detects a new way to notify logouts (for example through cookies), then the method of the present invention can be extended to use any such new criteria.

Finally, the method of the present invention provides a public API ("Application Programmer Interface") through which the users can decide to do whatever is required with such a logout event. The API is generic and can be used by any web application to encompass a list of tasks that needs to be executed after the logout event is detected.

In sum, the method of the present invention consolidates all of the possible solutions in the market for trapping a logout event in a single method and provides enough hooks for the end user to configure and extend the method as they see fit.

While the present invention may be used as part of a software system that protects applications, it is important to note that the present invention does not actually contribute any form of protection by itself. The present invention, however, renders an important service that is very useful to vendors in order to provide seamless integration of multiple sessions and applications as is explained in greater detail below.

The foregoing and other features, utilities and advantages of the invention will be apparent from the following more particular description of an embodiment of the invention as illustrated in the accompanying drawings.

WRITTEN DESCRIPTION

Figure 1:
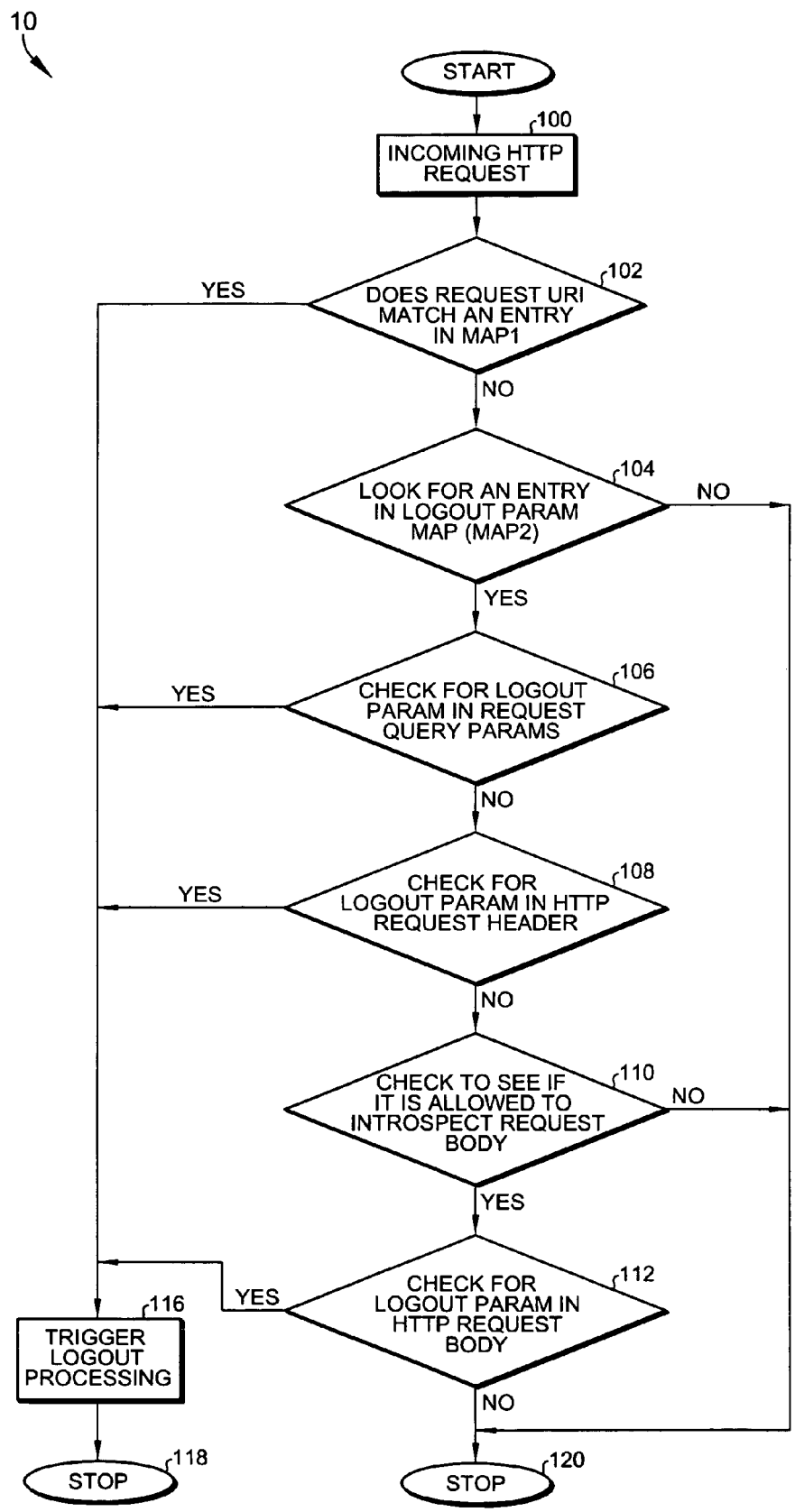
FIG. 1 is a flow chart according to the method of the present invention for detecting a logout event.

Referring generally now to FIG. 1, the steps of the method of the present invention are shown in a flow chart 10 that are used to detect an HTTP logout event. Each of the main steps of the method of the present invention are described in turn below.

At the initial step 100, an incoming HTTP request is received by software that can intercept any HTTP requests (not shown in FIG. 1). Applications running web/application/portal servers have different mechanisms to intercept any such HTTP request.

At step 102, the method of the present invention initially tries to match the logout URI to a URI that can be configured by the end user. Since there are multiple HTTP applications the invention maybe protecting, the method of the present invention provides a first map ("logout URI map") that signifies the logout URI associated with a specific application URI.

In the present context, a map is a construct that is defined as follows:
Format:

<key>[<name>]=<value>

Where <key> is the configuration key, <name> is a string that forms the lookup key as available in the map, and <value> is the value associated with the name in the map. Properties that are specified in this manner should ideally follow the above format, otherwise they are be treated as invalid or missing properties. For a given <name> there may only be one entry in the configuration for a given configuration key (<key>). If multiple entries with the same <name> for a given configuration key are present, only one of the values are loaded in the system and the other values are discarded.
Example:
com.sun.am.policy.example.map[AL]=ALABAMA
com.sun.am.policy.example.map[AK]=ALASKA
com.sun.am.policy.example.map[AZ]=ARIZONA As an example, there are two applications "/vacationApp" and "/shoppingApp" for which the method of the present invention is attempting to trap a logout event. The first application "/vacationApp" is the URI to the online vacation deal finder web application and the second application "/shoppingApp" is the URI to the application that does online shopping. The above description of these two applications is by way of example only, and any number of such applications having a logout URI specified in the map can be used. Nothing limits the number of application-specific URIs that can be put in a map.

This property specifies the application-specific logout URI value used by the invention to detect the need to logout the user. If the request URI matches with the logout URI specified in the map, the algorithm proceeds to call the logout handler. Both of the two applications have two separate logout URIs. Hence the map would look like:
logout.uri.map[vacationApp]=/logout/logoutvacation.html
logout.uri.map[shoppingApp]=/logout/logoutshopping.jsp The framework (i.e., the superstructure on which systems and network management services are mapped and coordinated, and the repository where data is managed) first reads the URI configuration while initializing the software that uses the present invention. Once an HTTP request comes in, the method of the present invention looks for the context URI in the request and searches for it in a first map ("Logout URI map" or "logout.uri.map"). If the method of the present invention finds an entry for the context path for the incoming request, it tries to match the URI to the entry in the map. If a match occurs, the framework detects a need to trigger a logout at step 116.

If step 102 of the method fails to find a match, the method of the present invention proceeds to step 104 where it tries to find a configurable request parameter in the query string. For the example mentioned above, the configurable map looks like:
entry[vacationApp]=logout
entry[shoppingApp]=foo The method of the present invention looks at the incoming request and tries to find the context path for the request. It then tries to find a match for the context path in this second map ("logout.parameter.map"). This property specifies the application-specific logout parameter value used by the invention to detect the need to call the logout handler in the logout.handler.map, explained in further detail below. If the method finds a match, it tries to find the request parameter (for example "logout" or "foo") at step 106 in the list of query parameters in the incoming request. If it finds a match, then it detects the need to logout at step 116.

If step 106 also fails to find a match, the method of the present invention starts looking into the HTTP header name/value at step 108. The example of the map in step 104 also holds true for step 108. Since the first two criteria have failed, the method of the present invention does not look for the request parameter in the HTTP header list. A configurable parameter is needed that allows the end user to tell the framework if it is allowed to look into the HTTP header name/values of the request at step 110. If so, the algorithm of the present invention iterates through a set of all the headers and tries to find a match for the request parameter in the HTTP header name/values in the request. If it finds a match for "logout" or "foo", it triggers a logout event at step 116.

If all the above mentioned attempts fail to trap the HTTP logout event, the method of the present invention, as a last resort, looks into the HTTP body for a request parameter that the application may have embedded at step 112. Many applications use this mechanism to convey a logout event. However, the intruding framework still needs permission to look into the HTTP body (the most sensitive part of the request) before it can proceed. So, the framework provides a configurable parameter that allows the user to inspect the HTTP request body. If the user of the framework allows inspection of the request, the method of the present invention proceeds and searches for the same request parameter in the HTTP request body at step 112. If a match is found for the incoming request context path in the example map in step 104, the method of the present invention triggers the need to logout the user at step 116.

A logout event is triggered at step 116, if an affirmative answer is found in steps 102, 106, 108, or 112. A negative answer at steps 104, 110 or 112 terminates the method of the present invention at final step 120. After the trigger logout processing has begun at step 116, the method of the present invention terminates at step 118.

If an application contains additional methods to notify a logout, for example an application may send a cookie for the logout event, the method of the present invention can use the additional notification method (in this example, trapping the cookie) to trigger a logout event.

Figure 2:
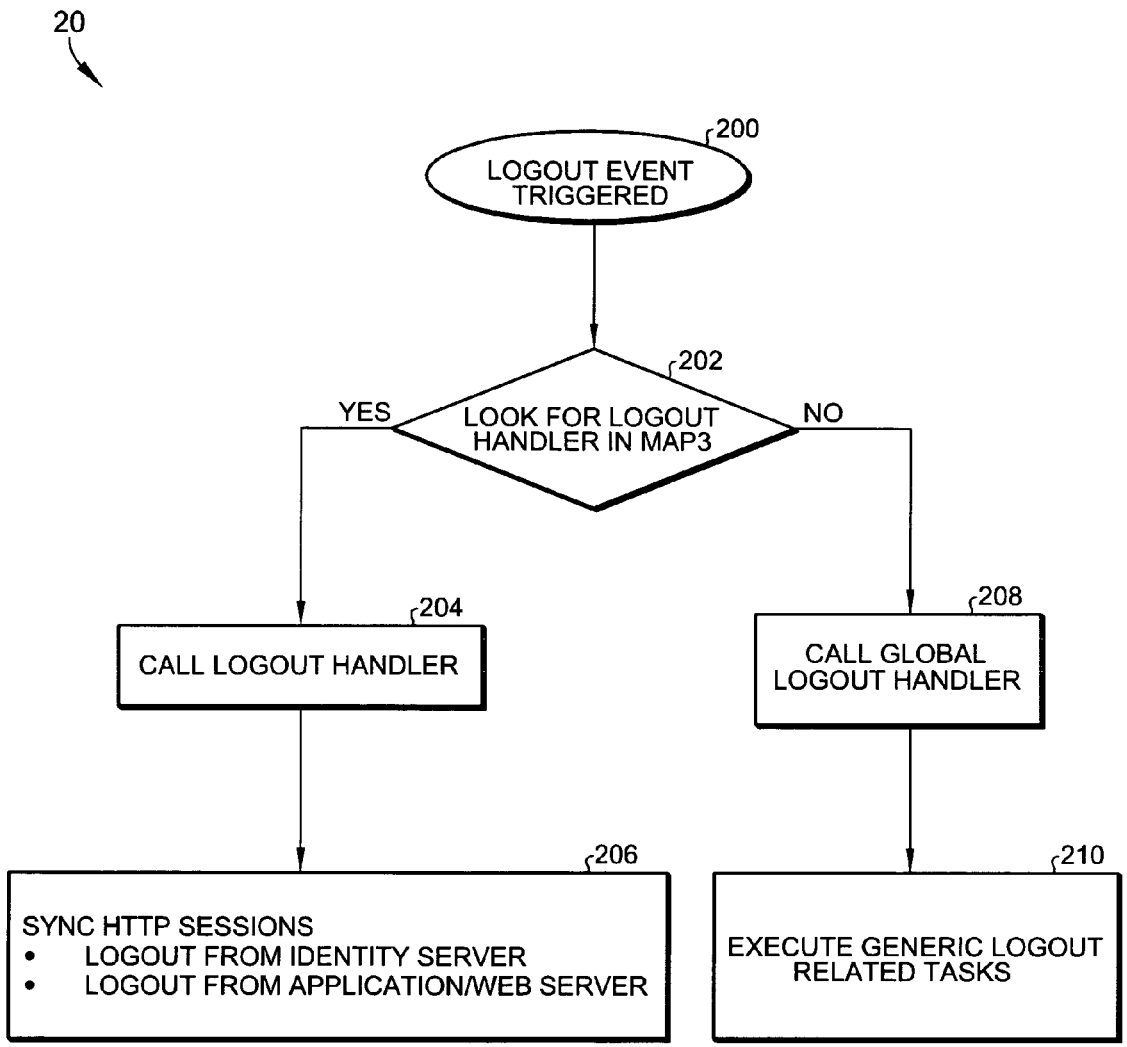
FIG. 2 is a flow chart according to the method of the present invention for calling a logout handler after detecting the logout event.

Referring now to FIG. 2, a flow chart 20 is provided according to the method of the present for calling a logout handler after detecting the logout event. A "handle" or "handler" is simply an interface that can be implemented to do certain housekeeping operations. Referring now to FIG. 2, once the method of the present invention traps the logout event, it does not need to provide the user a generic handler that can perform as many steps as the user requires to handle the logout event. The logout handler should ideally be a third map ("local logout handler map" or "logout.handler.map") so that multiple applications can have multiple logout handlers to perform various steps.

This property specifies the application-specific local logout handler that can be used by the invention to invalidate the HTTP session in the application/web/portal server. All applications in the map may have a local logout handler. If a specific application has a local logout handler it is loaded by the method of the present invention. If the mechanism fails to load the application-specific local logout handler then the user gets an "access denied" error message for the requested resource.

One such logout handler can invalidate the user identity session and also destroy the application servers HTTP session thus providing session synchronization between the identity provider and the application/web server. The logout handler should provide a public API through which the user of the framework can plug in their code when the logout event is detected. The logout handler should not stipulate the nature of the task the logout handler should execute once the framework has detected a logout event.

At step 200, a logout event is triggered. At step 202, the method of the present invention looks for a logout handler in the local logout handler map. If a logout handler is found, the logout handler is called at step 204. The method proceeds to step 206 to synchronize HTTP sessions, such as logging out from an identity server or logging out from an application web server.

If a logout handler is not found, a global logout handler is called at step 208. The method proceeds to step 210 to execute generic logout-related tasks.

Figure 3:
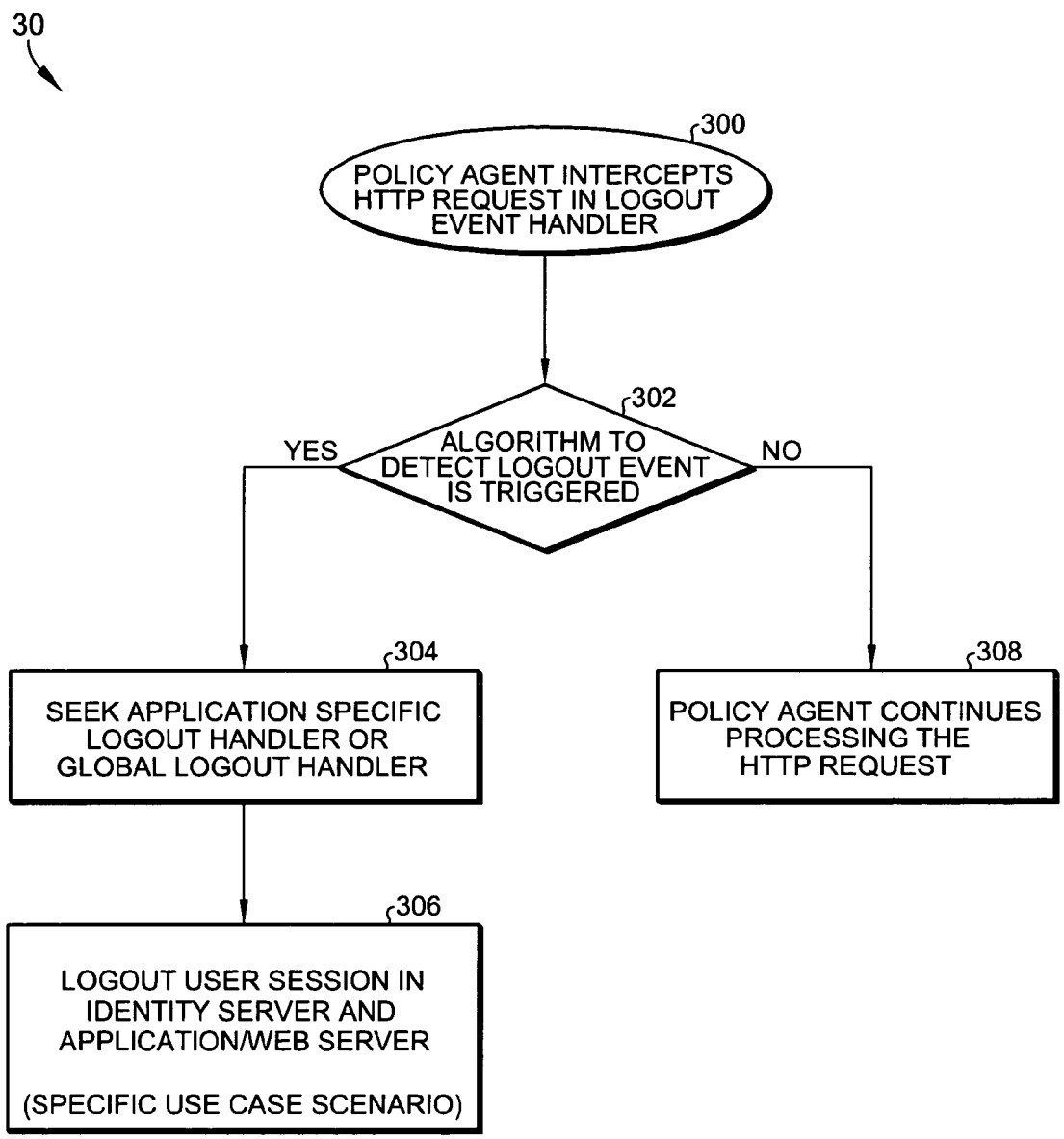
FIG. 3 is a flow chart of a use case scenario for the method of the present invention used in the context of policy agents.

Referring now to FIG. 3 a flow chart 30 is provided of a "use case" scenario for the method of the present invention used in the context of policy agents. A policy agent is simply described as software that enforces policies on web-based resources. The policy agent intercepts the HTTP request and calls its request processing handlers at step 300. One of these handlers has the method of the present invention embedded in it. Once the method of the present invention is called at step 302, the code tries to detect a logout event for the user trying to match the various conditions as shown in FIG. 1 and described in detail above. If a match is found, the method of the present invention looks, at step 304, for an application specific logout handler or a global logout handler as shown in FIG. 2 and described in detail above. The logout handler then tries to logout the user session from the backend identity server and application/web server thus synchronizing the HTTP sessions at step 306. If a logout event is not detected at step 302, then the policy agent continues processing the HTTP request at step 308.

The method of the present invention can be extended beyond applications involving policy or web/j2ee agents. The method of the present invention is designed to be generic and so can work in many different web-based computing environments. A computing environment including policy/web/j2ee agents is just one context in which the method of the present invention can be used. The method of the present invention can be fitted in any piece of code that can be executed in a web/application/portal server intercepting a HTTP request. In the use case scenario described above with respect to FIG. 3, it is clear that the method of the present invention is being implemented in conjunction with policy agents, but the method of the present invention can be used in any web-based computing environment involving HTTP clients.

The method of the present invention can be plugged into any application deployed on a web/application/portal server. It can be plugged in any server that can deploy HTTP-based applications. The method of the present invention is independent of programming language. Any programming language can be used to implement the method of the present invention and hence it can plugged into web servers (running on c, c++ or c#) or application/web/portal servers (running on java, etc). The method of the present invention has a pluggable framework through which new logout trapping events can be configured. If a new product finds a new way to trap logout events the method of the present invention can be easily plugged into the new framework. Finally, the method of the present invention allows the user to plug in a call-back handler that can execute any housekeeping tasks. In this specific use case, the invention logs out the user from the identity provider and the application server thus synchronizing all the user sessions.

While there have been described above the principles of the present invention in conjunction with specific components, circuitry and bias techniques, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

We claim:

1. A method for trapping an HTTP logout event comprising:
- receiving an HTTP request;
- checking if a URI of the HTTP request matches an entry in a first map comprising a plurality of logout URI entries for a set of applications;
- if the URI of the HTTP request matches an entry in the first map, then triggering a logout event for one of the applications in the set of applications corresponding to the matching entry in the first map;
- if the URI of the HTTP request does not match an entry in the first map, then looking for an entry in a second map; wherein looking for an entry in a second map comprises looking for an entry in a logout parameter map comprising a plurality of logout parameter values for the set of applications that matches a logout request in a list of query parameters in the received HTTP request;
- checking for a logout parameter in a list of request query parameters if an entry is found in the logout parameter map;
- checking for a logout parameter in a header of the HTTP request if a logout parameter is not found in the list of request query parameters;
- checking for permission to inspect a body of the HTTP request if a logout parameter is not found in the header of the HTTP request;
- searching for a logout handler in a third map;
- calling the logout handler if the logout hander is found in the third map and synchronizing an HTTP session; and
- calling a global logout handler if a logout handler is not found in the third map.

2. The method of claim 1 further comprising continuing the HTTP request if an entry is not found in the logout parameter map.

3. The method of claim 1 further comprising triggering a logout event when a match is found between the logout request and one of the logout parameters.

4. The method of claim 1 further comprising triggering a logout event if a logout parameter is found in the header of the HTTP request.

5. The method of claim 1 further comprising continuing the HTTP request if permission to inspect the body of the HTTP request is not given.

6. The method of claim 1 further comprising checking for a logout parameter in the body of the HTTP request if permission is given.

7. The method of claim 6 further comprising triggering a logout event if a logout parameter is found in the body of the HTTP request.

8. The method of claim 1 further comprising triggering a logout event through the use of cookies.

9. The method of claim 1 further comprising executing a task after triggering the logout event.

10. The method of claim 1 comprising logging out from an identity server.

11. The method of claim 1 comprising logging out from an application/web/portal server.

12. The method of claim 1 further comprising executing logout-related tasks.

13. A method of trapping a logout event sequentially comprising:
- (a) receiving an HTTP request;
- (b) checking if a URI of the HTTP request matches one of a plurality of logout URIs mapped to one of a set of applications;
- (c) checking for a logout parameter in a list of request query parameters for the set of applications that matches a query parameter in the HTTP request;
- (d) checking for a logout parameter in a header of the HTTP request;
- (e) checking for a logout parameter in a body of the HTTP request;
- (f) triggering a logout event for a corresponding one of the applications in the set of applications after step (b) if the HTTP request matches one of the plurality of logout URIs or after one of steps (c), (d), or (e) if a logout parameter is found;
- (g) seeking an application specific logout handler after a logout event is triggered for the corresponding one of the set of applications associated with the HTTP request, wherein the seeking comprises accessing a local logout handler map mapping each application in the set of applications to a logout handler for synchronizing HTTP sessions for the corresponding one of the set of applications; and
- (h) continuing processing the HTTP request with a policy agent if a logout event is not triggered.

14. The method of claim 13 further comprising intercepting the HTTP request before step (a) with a policy agent.

15. The method of claim 13 further comprising the use of a call-back handler to execute housekeeping tasks.

* * * * *

UNITED STATES PATENT AND TRADEMARK OFFICE
CERTIFICATE OF CORRECTION

| | | |
|---|---|---|
| PATENT NO. | : 7,703,105 B1 | |
| APPLICATION NO. | : 11/186214 | |
| DATED | : April 20, 2010 | |
| INVENTOR(S) | : Krishnendu Chakraborty et al. | |

It is certified that error appears in the above-identified patent and that said Letters Patent is hereby corrected as shown below:

In column 3, line 40, delete "maybe" and insert -- may be --, therefor.

In column 7, line 29, in claim 1, delete "hander" and insert -- handler --, therefor.

Signed and Sealed this
Twelfth Day of April, 2011

David J. Kappos
*Director of the United States Patent and Trademark Office*